United States Patent [19]
Stanley

[11] Patent Number: 5,211,599
[45] Date of Patent: May 18, 1993

[54] ADJUSTABLE SIZING DEVICE FOR TUBULAR FOOD CASING

[75] Inventor: Thomas R. Stanley, Kansas City, Mo.

[73] Assignee: Teepak, Inc., Westchester, Ill.

[21] Appl. No.: 794,742

[22] Filed: Nov. 19, 1991

[51] Int. Cl.⁵ ............................................. A22C 11/00
[52] U.S. Cl. ........................................ 452/37; 452/38
[58] Field of Search ..................................... 452/37, 38

[56] References Cited

U.S. PATENT DOCUMENTS

| | | | |
|---|---|---|---|
| 4,505,003 | 3/1985 | Becker et al. | 452/38 |
| 4,521,938 | 6/1985 | Kupcikevicius | 452/38 |
| 4,535,508 | 8/1985 | Aceto | 452/38 |
| 4,649,601 | 3/1987 | Kollross | 452/22 |
| 4,958,411 | 9/1990 | Stanley | 452/37 |

*Primary Examiner*—Willis Little
*Attorney, Agent, or Firm*—Howard M. Ellis; Michael L. Dunn

[57] ABSTRACT

Casing material is paid out from the stuffing horn of a food emulsion extrusion system to stuff a food emulsion product. The casing material is drawn over a sizing means which provides varying degrees of sizing and hold back force to the casing material as it is paid out. The degrees of sizing and hold back force are adjustable while the casing is being stuffed with extruded food emulsion. New casing material may be loaded onto the stuffing horn over the sizing means without removal of any element of the sizing means from the stuffing horn.

12 Claims, 6 Drawing Sheets

ADJUSTABLE SIZING DEVICE FOR TUBULAR FOOD CASING

FIELD OF THE INVENTION

The present invention relates generally to the field of producing encased food emulsion products and more specifically to the production of consistent dimensions and density within such products as they are encased.

BACKGROUND OF THE TECHNOLOGY

In the food emulsion packaging industry, products such as sausage, frankfurters, various cheeses, processed hams, bologna, etc., are produced and packaged in casings. The casing materials are either natural or synthetic and are variously edible and nonedible. Predominantly, shirred casing sticks are used in the stuffing of food emulsion products, the casing material being in tubular form. A casing stick is produced from axially compressing a length of tubular casing material such that accordion-like pleats are formed, substantially decreasing the length of the tubular casing material from extended lengths of 70 to 100 feet or more to compressed lengths which may be only as long as 10 to 20 inches. Typically, the shirring of tubular casing material has been a separate operation from that of stuffing the casing to produce the food emulsion products. More recently, the shirring of the casing has been done by various methods, using automated equipment, directly in conjunction with the operation of the stuffing equipment itself, especially in highly automated stuffing operations. When such "on-site" shirring methods are employed, typically a length of tubular casing material is shirred rapidly and then, in its shirred form, is immediately transferred to and fitted over, for example, a stuffing horn which forms an extension from a food emulsion pump. Regardless of the method used, the shirred casing stick ends up being axially telescoped onto the stuffing horn which then extends through the bore of the casing stick.

Food emulsion products range in diametrical size from rather small, such as, for example, Vienna sausage, up to relatively large sizes such as, for example, bologna. Regardless of the diametrical size of the end product, the method of stuffing the food emulsion into the casing is predominantly the same: the stuffed food emulsion is pumped through a stuffing horn into a tubular casing which is paid out from a shirred stick which has been fitted over the stuffing horn. (In some situations, nonshirred casings are used to produce larger diameter products.) The pressure and force exerted by the moving food emulsion extrusion pulls the casing, into which the food emulsion is being stuffed, along with it, thus packaging the product. Various means, well known to those with skill in the art, are employed to form the encased food product into links, as might be found in frankfurters, or into chubs which is a term applied to lengths of bologna. Various means are used to separate and cut off the lengths or chubs.

Large sausage products are predominantly used in producing sliced products for sale to the public. Much of this sliced product business today is based on selling prepackaged quantities wherein the sliced pieces must have consistent texture, density and size to enhance customer appeal and also so the packaged product, package by package, is consistent in weight. It is very common to find sliced prepackaged products which have a consistent weight of, for example, 12 ounces. For smaller food emulsion products, such as frankfurters, there are normally a set number of pieces in a given weight package such as, for example, 10 frankfurters in a 16 ounce (one pound) package. Cheeses are normally sold in either presliced packages of consistent weight or in short cylindrical sections which consistently weigh, for example, one pound. To produce such products having consistent weight, the stuffing operation must be able to produce a product which has consistent density and a consistent cross sectional size. For sliced products, this insures that each slice will weigh exactly the same as each other slice. For link products each link would weight exactly the same as each other link. Thus the packaging of these products can be accomplished on automated high speed packaging equipment without the necessity to weigh and mark each separate package. In addition, sizing of the pieces to be prepackaged is important to ensure that they will fit uniformly into the packaging that was designed for them.

Over many years the industry has determined through experience (trial and error), the optimum stuffing and processing conditions for various types of food emulsion products. Such products generally are sought to be stuffed and encased to an ideal "green" or unprocessed diameter. When a casing is understuffed from the recommended green diameter, the resultant product is usually not uniform in diameter from end to end and from piece to piece. The product may have a wrinkled appearance caused by the casing not being fully expanded to the extent of its design. This, by itself, creates a product with diminished appeal to the customer. In addition, there is a tendency for such understuffed products to have what is known as "emulsion breakdown" resulting in the formation of pockets of fat or liquid which further degrade the product in respect to end use. Such an understuffed product, of course, cannot be used for prepackaging where consistent weight and sizing are critical. On the other hand, when a casing is overstuffed beyond the recommended green diameter, the elastic limits of the casing material may be exceeded, causing the casing material to split and break apart either at the stuffing station or subsequently, in transport, or in cooking, smoking or other processing operations. The result is wasted product and the complications, labor and expense which are necessary for the clean up. Even if the elastic limits of the casing material are not exceeded, because the thickness and compositional consistency of the casing material varies to some degree, overstuffing may well cause bulges resulting in inconsistencies in the cross sectional sizing of the food emulsion product, from end to end, over its length. As mentioned before, such can readily result in inconsistent piece or link weights for prepackaged products, and may cause difficulty in the actual packaging due to inconsistent size control.

Many devices and systems have been proposed and are well known to those with skill in the art for controlling the pay out of tubular casing material from the shirred casing stick on the stuffing horn. These generally fall into two categories. The first of these categories is referred to as a brake. A brake system usually acts to apply circumferential pressure or force onto the outside of the casing material at a point which is adjacent to the end of the stuffing horn. Thus, the casing material must traverse a small space between the outside diameter of the stuffing horn and the inside diameter of the brake. The function of a brake is to provide an interference fit between the brake and the stuffing horn such that a desired degree of force is required to pull the casing material through the small space. Some variation in the sizing of this small space can be applied by increasing or decreasing the pressure imposed by the brake means. For example, the brake means may be a resilient ring made of some sort of synthetic elastomer with its inside diameter axially being smaller than the outside diameter of the stuffing horn. With such a device, typically the brake ring is forced over the end of the stuffing horn, expanding the elastic brake ring such that consistent pressure is placed circumferentially onto the outside diameter of the tubular casing material. This pressure results in friction between the outside surface of the casing material and the brake ring as well as the inside surface of the casing material and the stuffing horn Sizing devices, on the other hand, take the form of discs or rings, of a given set size, which are placed over the stuffing horn adjacent to its outlet end, being arranged such that the casing material must traverse over the sizing device. The principal of operation is that the sizing device is set and designed to expend the casing material, and in some cases slightly stretch it to its ultimate diameter, as the casing material traverses over the sizing device. Sizing devices tend to take out substantially all of the folds, pleats and wrinkles in the casing material and, further, to impose a frictional contact to the moving casing material as it passes over the sizing device. Thus, a given amount of pressure and force is required to pull the casing material over the sizing device. The pulling force and pressure, which move the casing material over the sizing device, are supplied by the moving food emulsion being extruded and stuffed into the casing.

In many cases, combinations of brake systems and sizing devices are used, the arrangement typically being that the casing material first is pulled over the sizing device and then through the small space between the brake means and the stuffing horn. Such combined arrangements are said to provide the ultimate degree of control over the pay out of the casing material as it moves from the shirred casing stick to the output end of the stuffing horn where the extruding food emulsion actually enters the casing. Various brake systems provide some degree of adjustment of the frictional pressure being applied to the casing material which is traversing the brake. However, there are no known effective methods for adjusting the frictional force being applied to the interior of the casing by the sizing devices as the casing material is in motion during the stuffing of the casing.

Because there are variations in casing wall thickness and compositional consistency, as well as variations in the consistency and density of the food emulsion as it exits the output end of the stuffing horn, it is desirable to provide as much control as possible to the flow of casing material being paid out from the shirred casing stick. It is known in the industry that, in respect to a given size of casing, increasing the diameter of the sizing disc increases the casing hold back by way of increasing the force required to overcome the friction between the sizing disc and the inside wall of the casing. However, this approach has its limitations in that care must be taken not to force the size of the casing material beyond its elastic limits or to provide too much frictional contact such that the extruding food emulsion overstuffs the casing, causing the problems discussed above. On the other hand, undersizing the sizing disc can result in the production of understuffed green product and the problems, likewise, discussed above.

As mentioned above, the problem is that, in respect to the sizing devices that are known, no means are known or available by which the sizing devices can be effectively adjusted after the stuffing operation commences. Unfortunately, the above-discussed variations and inconsistencies do not become readily apparent until the stuffing operation is commenced, and the only way, at that point, of compensating for such variations and inconsistencies is by halting the stuffing operation to make adjustments. This necessitates disassembly of the system as the shirred casing stick needs to be removed from the stuffing horn, either to make adjustments to the sizing device or to install a different size of sizing device. In the high-speed automated operations used at present in the food stuffing industry, not only is such a requirement undesirable and impractical but it also is considered intolerable. As a result, much attention has been focused on improving the consistency and wall thickness of the casing material as well as on improving the consistency and density of the food emulsion as extruded. Although significant strides have been made in improving these areas, the variables and inconsistencies still exist and are still a notable factor inhibiting optimization of the production of encased food emulsion products.

U.S. Pat. Nos. 3,457,588 and 3,553,769 teach the use of an unusually complicated and cumbersome adjustable sizing device with several, typically four, sizing elements which can be radially expanded outwardly from the stuffing horn by simultaneously turning elongated shafts. The elongated shafts are extended parallel to the axis of the stuffing horn to about the point where the stuffing horn is connected to the food emulsion pump. The elongated shafts are rotated simultaneously through a system of toggle links driven by a means for producing linear motion, i.e., a machine screw.

U.S. Pat. No. 4,202,075 also teaches means for adjusting the size of a sizing device. The sizing device taught by this reference is formed from a tubular mechanism with an enlarged end which radially engages the internal surfaces of the casing being drawn across it. The mechanism disclosed by U.S. Pat. No. 4,202,075 does not provide any means for adjustment of the sizing device during the stuffing of the casing, but rather, only when the casing material is stationary.

U.S. Pat. No. 4,535,508 teaches the use of an expandable casing sizing mechanism with sizing members which are radially expandable in contact with the internal casing surfaces. However, like the device shown in U.S. Pat. No. 4,202,075, the apparatus of U.S. Pat. No. 4,535,508 is not adjustable during the casing stuffing operation when the casing material is moving.

U.S. Pat. No. 4,512,059 discloses a rigid petal-like sizing member, including means for applying force for outwardly expanding the device against the inner surface of the casing. In this device, the force for expanding the petals of the sizing member is provided by the movement of the casing itself, but is not adjustable to vary the amount of force being applied to the moving casing material.

U.S. Pat. 4,528,719 discloses a sizing ring comprising two pieces. The two pieces are compressed together, one element inside the other, to expand the device against the interior of the moving casing material, but not while the casing material is moving.

U.S. Pat. Nos. 4,077,090 and 4,164,057 both disclose a combination sizing device and brake ring assembly. The sizing device is mounted on a slidable sleeve, fitted onto and over the stuffing horn. The sleeve is moved reciprocally along the longitudinal axis of the stuffing horn. Longitudinal movement of the sleeve causes the sizing device to engage the inside wall of the casing and push it against a stationary brake ring, thus applying adjustable frictional force to both the inside and outside walls of the casing material before it comes into contact with the stuffing horn. Following this, the flow of casing material is redirected against the stuffing horn and through a more or less conventional brake ring. In these two patents, however, there is no means included for adjusting the sizing or braking forces during the stuffing of the casing.

U.S. Pat. No. 4,727,624 teaches a single piece sizing device of resilient material which can be expanded and contracted radially, adjusting the pressure imposed on the inside surface of the casing material. Unlike many of the previous sizing devices, the apparatus of U.S. Pat. No. 4,727,624 may be adjusted during the stuffing of the casing by longitudinal movement of a pipe which is fitted over the stuffing horn, the pipe being extended toward the food emulsion pump to the input end of the stuffing horn and beyond the remote end of the shirred casing stick which is fitted over the pipe. Longitudinal motion of the pipe imposes pressure onto the one piece sizing device which, in turn, expands radially to increase the pressure on the inside surface of the casing material. This causes hold back and expansion of the casing material simultaneously. However, the adjustment can only be accomplished if the food emulsion extrusion is halted, and thus this sizing device is not designed for adjustment while the casing material is moving.

None of the foregoing patents describe or disclose an uncomplicated or noncumbersome sizing mechanism which is both adjustable during the stuffing operation and wherein the sizing mechanism does not need to be removed from the stuffing horn in order to load casing material onto that stuffing horn. In addition, none of the foregoing devices are readily adaptable to the automated, on-site casing shirring mechanisms with automated food emulsion stuffing systems, both of which are becoming increasingly and prominently used in the food emulsion stuffing industry. Such devices usually require casing material which has been previously shirred into casing sticks at a separate location. Accordingly, means are needed which are adaptable to shirring and can provide sizing of the casing material as it is paid out from the stuffing horn, to both size the casing material by expanding and smoothing it from its shirred state and to provide hold back to insure correct sizing of the stuffed food emulsion product as explained previously. Such sizing means should be adjustable during stuffing operations to compensate for the variations in both the food emulsion being extruded and in the casing material, should be adjustable to provide casing material expansion where desired and should be operable to either permit the fitting of a shirred casing stick thereover without removal of the sizing means from the stuffing horn or permit the shirring of the casing material as it is telescoped onto the stuffing horn, likewise, without removal of the sizing means from the stuffing horn.

SUMMARY OF THE INVENTION

The present invention comprises means for sizing food emulsion casing material as it is paid out from the end of, for example, the stuffing horn of a food emulsion extrusion system. The sizing device is preferably adapted to unfold the pleats of a shirred casing stick while concurrently smoothing the wrinkles in the surface of that casing stick, both being accomplished as the casing material is moved over the surface contact areas of the sizing means. The sizing means is fully adjustable, while the casing material is moving over it, to either stretch and expand the material of the casing or to avoid stretching the material of the casing, depending on the desire of the food emulsion extrusion system operator. The means for sizing also provides the desired degree of hold back to the pay out of the casing material and is fully adjustable in respect to the degree of hold back applied while the casing material is moving over that sizing means. Adjustment to the sizing means may be accomplished at any time as the sizing means preferably includes remote adjustment means which are operable both while the casing is being stuffed and otherwise. Thus, detected variations in the casing material thickness and composition, as well as variations in the perimeter size of the casing material, may be compensated for immediately as the casing material is being stuffed by the food emulsion extrusion system. In addition, variations in the composition of the food emulsion itself may be likewise compensated for during the stuffing of the casing by the food emulsion extrusion system.

Primarily, the sizing means is designed to permit the shirring of casing material as it is telescoped over the stuffing horn, using unshirred casing material paid out from, for example, rolls of continuous, flattened casing material. The casing material is projected onto and over the stuffing horn by means known to those with skill in the art.

Further, the sizing means may be adapted to permit the sheathing or telescoping of an unshirred casing material over the sizing means and onto the stuffing horn of the food emulsion extrusion system, without disassembly or removal of the sizing means or any part or portion of it, thus permitting the use of known automated, on-site casing shirring equipment in combination with the food emulsion extrusion system. Advantageously, the sizing means of the present invention is preferably adapted to be mounted onto and over a standard stuffing horn of a food emulsion extrusion system without modification or change to that stuffing horn. On the other hand, the sizing means of the present invention may be readily adapted to other means for stuffing as will be well understood by those with skill in the art.

Adjustment to the sizing means of the present invention may be accomplished manually by the operator of the food emulsion extrusion system or may be accomplished, at the other extreme, by a fully automated and computerized detection and closed loop feed back system adapted to operate mechanized means for adjustment of the sizing means; of course, any degree, style, type or design of automation and/or mechanization to such adjustment means, within the understanding of those with skill in the art, are included within the scope of the present invention. The adjustment means of the present invention is preferably adapted to permit the use of different codes or sizes of casing without change of the sizing means provided the internal bore of the unshirred casing material is sufficiently large enough to permit the sheathing or telescoping of that material over the sizing means. The present invention is readily adapted to be applied to the production of a full range of sizes of stuffed and encased food emulsion products, for example, a range of products from the smallest being, e.g., Vienna sausage and the like, to the largest being, e.g., bologna and similar sized products. The present invention is also adapted to be used with a full range of casing materials including those which are natural and those which are synthetic, those which are edible and those which are nonedible. The present invention may be readily used with unshirred casing materials without adaptation, and it could be adapted to be used with pre-shirred casing sticks.

In the preferred embodiment of the present invention, the adjustment means comprises a tube which is sheathed or telescoped over and onto the stuffing horn of a food emulsion extrusion system. The tube predominantly encases the stuffing horn but is preferably not as long as the stuffing horn itself. At the input end of the stuffing horn, i.e., that end which is mounted to the food emulsion pump of the extrusion system, there is a bearing means, for example, a Teflon ® PTFE ring which is fitted over the stuffing horn and slid along its length to abut against the food emulsion pump. Next, the tube of the adjusting means is telescoped over the length of the stuffing horn into abutment with the bearing means. Then, positioning means are fitted over the output end of the stuffing horn and slid back against the end of the tube of the adjusting means. The positioning means are then fixed to the food emulsion stuffing horn with sufficient clearance to permit the rotation of the adjustment means about the longitudinal axis of the stuffing horn.

In the preferred embodiment, the positioning means are fixed stationarily to the stuffing horn such that such means do not rotate, but however are removable for cleaning, etc., as, for example, by use of a set screw means. Interposed between the adjustment means and the positioning means are preferably a plurality of sizing heads. At least one of these sizing heads is fixed to the positioning means and remains stationary. Another of the sizing heads is preferably mounted in fixed position to the end of the adjustment means and moves with rotation of the adjustment means about the stuffing horn. Additional movable sizing heads may be interposed as will be hereinafter explained.

The sizing heads are preferably adjustable such that in their fully retracted position, a length of unshirred casing material may be sheathed or telescoped over them with sufficient clearance in between to result in a loose fit. On the other hand, the sizing heads are preferably adjustable in their extended position such that they are adapted to fully expand the casing material to its full unshirred perimeter dimensions or somewhat beyond by stretching the casing material. Thus the degree of frictional contact and force imposed by the sizing means on the interior walls of the casing material is preferably fully adjustable providing both expansion of the casing material, stretching it if desired, and fully adjustable hold back force to the pay out of the casing material from the output end of the stuffing horn. If desired, the sizing means of the present invention may be designed, in length, such that sufficient length of the stuffing horn extends therebeyond to mount a conventional brake device (a device which imposes force to the exterior walls of the moving casing material).

Accordingly, it is a principal object of the invention to provide an improved food stuffing apparatus for tubular food casings. The apparatus includes:

(a) a food casing filling horn means with a food inlet end, a food outlet end and a cylindrical shaft intermediate to the inlet and outlet ends. As with most food casing filling machines, the improved apparatus includes pump means for extruding a foodstuff through the food casing filling horn means; and (b) the above elements are used in combination with a stationary food casing sizing means and an independently adjustable food casing sizing means telescoped over the cylindrical shaft of the food casing filling horn for expansion of unfilled casing loaded on the filling horn. Both the stationary food casing sizing means and the adjustable food casing sizing means have means for engaging and peripherally expanding the food casing. Only movement of the adjustable food casing sizing means being required in order for both the stationary and adjustable food casing sizing means to engage and expand the casing immediately prior to being filled.

It is a further object of the invention to provide for an improved stuffing apparatus which incorporates novel sizing heads which can be circular in shape and eccentrically mounted in a plane which is transverse to the longitudinal axis of the food casing stuffing horn. Alternatively, the invention contemplates sizing heads for engaging and expanding tubular food casing on the stuffing horn which are generally oblong in shape.

It is yet a further object to provide such a filling apparatus in combination with means for shirring casing directly onto the filling horn without disassembly or removal of the sizing device.

A still further principal object is to provide for a method of stuffing tubular food casing by the steps of:

(a) providing a stuffing apparatus for tubular food casing comprising a filling horn, pump means for extruding a foodstuff through the filling horn, a stationary casing sizer head and an adjustable casing sizer head. The casing sizer heads are telescoped over the filling horn and positioned transverse to the longitudinal axis of the filling horn;

(b) rotating the adjustable casing sizer head to substantially align it with the stationary sizer head;

(c) loading a tubular food casing onto the filling horn and over the casing sizer heads without disassembly or removal, and (d) rotating the adjustable casing sizer head sufficiently for both the stationary sizer head and adjustable casing sizer head to engage and peripherally expand the casing on the filling horn as a foodstuff is extruded into the casing to withdraw empty casing from the filling horn.

These and other features of the sizing means of the present invention will be more fully explained and disclosed in greater detail by the accompanying drawings and the following detailed description of the preferred embodiment. As will be well understood by those with skill in the art, the sizing means of the present invention may readily be adapted to the packaging of many other substances, foodstuff as well as materials which are not foods. Thus, the description herein in relation to food emulsion products is intended to be exemplary and is not intended to be a limitation regarding application of the present invention.

DETAILED DESCRIPTION OF THE INVENTION

Figure 1:
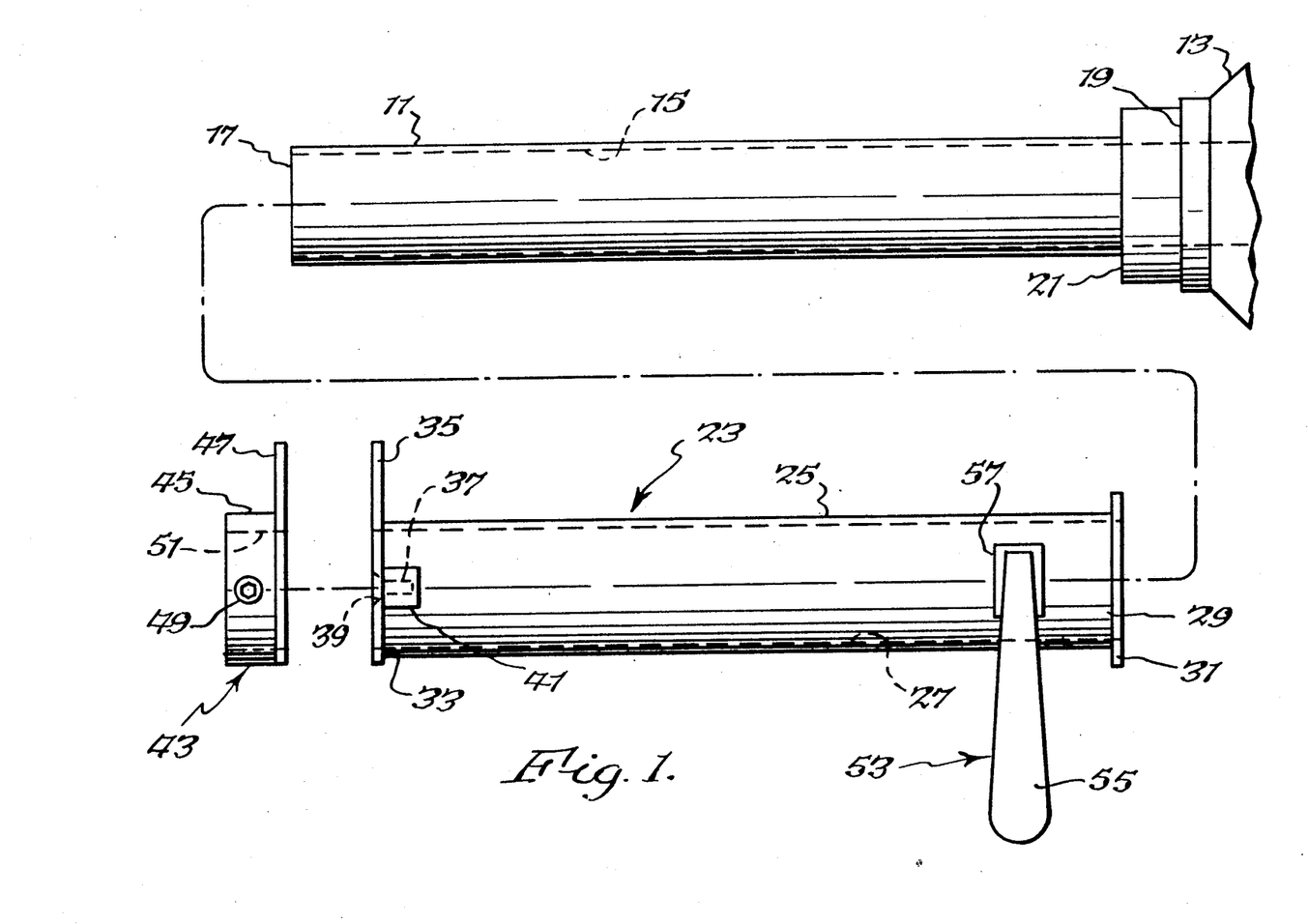
FIG. 1 an exploded side elevational view of the sizing means of the present invention as it relates to a conventional stuffing horn of a food emulsion extrusion system.

Referring to FIG. 1 there is shown a stuffing horn 11 mounted to a conventional meat pump 13. The stuffing horn 11 is in the form of a tube with an internal bore 15 extending therethrough into meat pump 13. Telescoped onto stuffing horn 11, from the output end 17 to the input end 19, is bearing means 21. Bearing means 21 may simply be in the form of a truncated cylindrical section of a Teflon® PTFE tube. The function of bearing means 21 is to provide thrust support for other elements of the sizing means of the present invention as will be further explained hereinafter; bearing means 21 also serves to space apart the other elements of the sizing means of the present invention from meat pump 13, providing a readily replaceable wear surface for the other elements of the sizing means of the present invention as will be further explained hereinafter.

Continuing with reference to FIG. 1, there is shown adjustment means 23. Adjustment means 23 preferably comprises an adjustment tube 25 which is an elongated cylindrical section with its inside diameter 27 sized to permit adjustment tube 25 and the balance of adjustment means 23 to be readily fitted over output end 17 of stuffing horn 11 and slid thereonto and telescoped therealong to the point of contact between adjustment means 23 and bearing means 21.

At the lead end 29 of adjustment tube 25, there is located bearing flange 31. Bearing flange 31 is fixed to the lead end 29 of adjustment tube 25, bearing flange 31 being that element of adjustment means 23 which comes into face-to-face contact with bearing means 21. Opposite to lead end 29 is trailing end 33 of adjustment tube 25. Removably fixed to trailing end 33 of adjustment tube 25 is adjustable sizing head 35.

Adjustable sizing head 35 is preferably removably fixed to trailing end 33 by, for example, recessed cap screws 37 extending through mounting apertures 39 in adjustable sizing head 35. Recessed cap screws 37 are threaded into bolt blocks 41 which may be permanently fixed to the exterior surface of adjustment tube 25 adjacent to trailing end 33 about as shown in FIG. 1. For example, bolt blocks 41 may be welded or brazed to adjustment tube 25 if adjustment tube 25 is made of a metal. Alternatively, bolt blocks 41 may be formed as an integral part of adjustment tube 25, for example, if adjustment tube 25 is made of a plastic material.

As will be well understood by those with skill in the art, bolt blocks 41 may be attached to adjustment tube 25 by a wide variety of well known different methods. Likewise, adjustable sizing head 35 may be mounted to and/or fixed to the trailing end 33 of adjustment tube 25 by any one of a variety of different well known methods as will be well understood by those with skill in the art. Adjustable sizing head 35 may be removable, for example, in the situation where adjustment tube 25 is made of metal and likewise, for example, adjustable sizing head 35 is made of metal also. Alternatively, for example, adjustable sizing head 35 could be made integral with adjustment tube 25 (as might be the case where all plastic material is utilized) as will be well understood by those with skill in the art. Preferably, adjustment means 23 is made from stainless steel although alternatively it could be made from any one of a wide variety of different metals or plastics or combinations of metals and plastics vis-a-vis the assembly of various elements of adjustment means 23.

Also shown in FIG. 1 is stationary sizing fixture 43 which preferably comprises fixed collar 45, in the form of a truncated cylindrical section, to which is mounted stationary sizing head 47. Fixed collar 45 is mounted to stuffing horn 11 and removably fixed thereto by, for example, hex-head set screw 49 which extends radially through fixed collar 45 in threaded engagement therewith, as will be well understood with those with skill in the art. The internal aperture 51 of fixed collar 45 is preferably sized the same as the inside diameter 27 of adjustment tube 25, both being sized to permit fixed collar 45 to be readily fitted over the output end 17 of stuffing horn 11 and slid therealong. Stuffing horn 11 extends through fixed collar 45 and beyond to provide a mount for a conventional braking device (not shown), if desired, and to provide a mount for casing expansion collar 75 as will hereinafter be explained in reference to FIG. 11.

Further, as shown in FIG. 1, adjacent to lead end 29 of adjustment tube 25 is positioned means for rotating 53 which functions to exert rotational pressure onto adjustment means 23, thus enabling the repositioning of adjustment means 23 circumferentially around stuffing horn 11. In its simplest form as shown in FIG. 1, rotational means 53 is comprised, for example, of handle 55 which extends tangentially from the diameter of adjustment tube 25 and handle mount 57. In the example shown in FIG. 1, handle 55 is mounted to handle mount 57 which in turn is fixed to the exterior surface of adjustment tube 25 as will be well understood by those with skill in the art by reading the following explanation and description. Handle 55 could be attached to adjustment tube 25 by any one of a number of different well known methods.

The tangential positioning of handle 55 in relation to the diameter of adjustment tube 25 is only one of a number of different positions that could be assumed by handle 55. For example, handle 55 could extend radially outward from adjustment tube 25, the only requirement being that force applied to handle 55, in a circumferential direction perpendicular to the longitudinal axis of adjustment tube 25, causes the rotational movement of adjustment tube 25 about its longitudinal axis. Handle mount 57 is optional and is merely shown to provide an exemplification of means to strengthen the attachment of handle 55 to adjustment tube 25 as will be well understood by those with skill in the art. Handle 55 and handle mount 57 may be fixed to adjustment tube 25 in the preferred embodiment, wherein the elements of adjustment means 23 are made of stainless steel, by, for example, welding. Alternately, handle 55 might be, for example, bolted to handle mount 57 as will be well understood by those with skill in the art.

Figure 2:
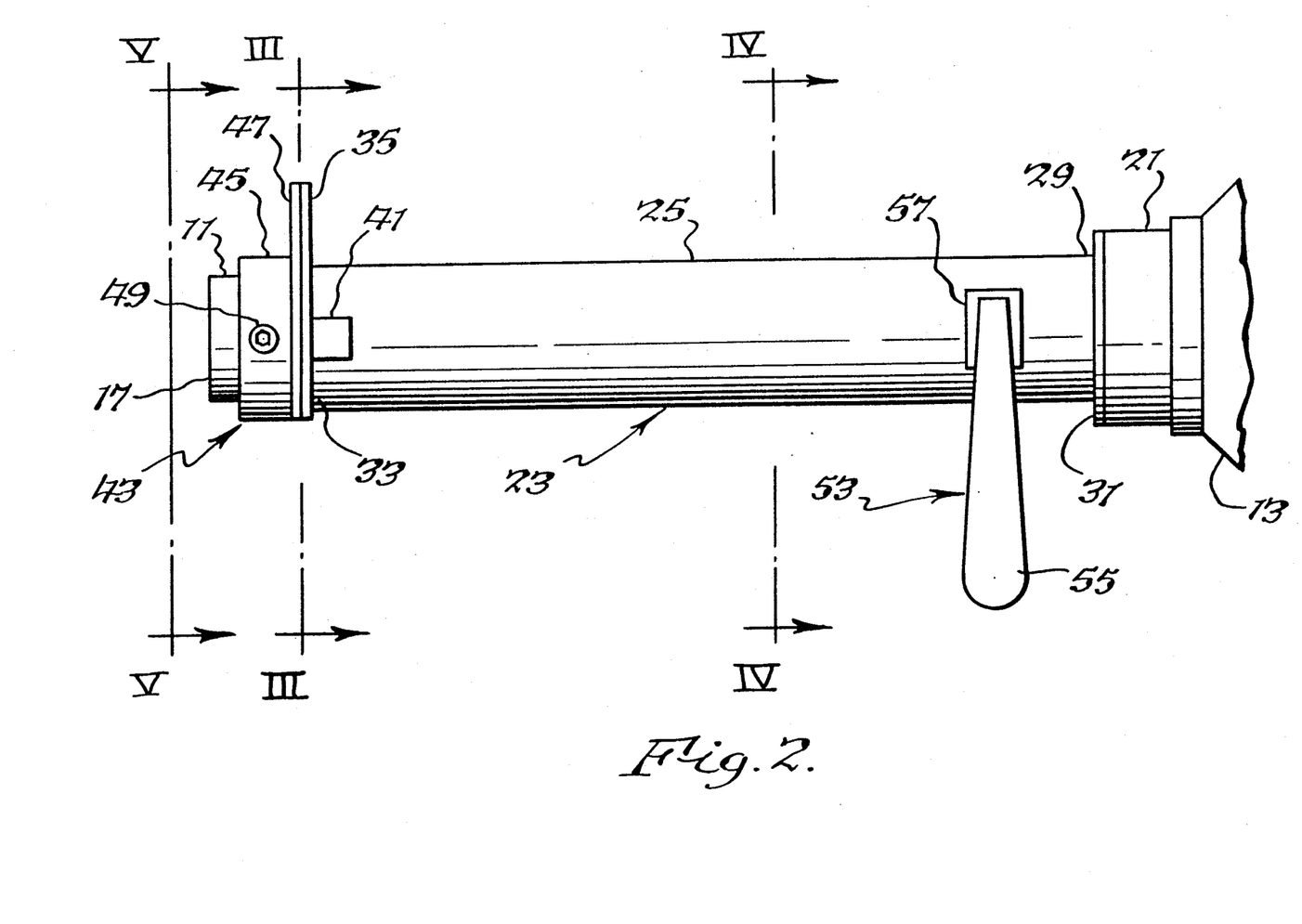
FIG. 2 is a side elevational view of the sizing means of the present invention showing the assembly of the elements shown in FIG. 1.

The assembly of the elements of the sizing means of the present invention are shown in FIG. 2. As can be seen from viewing FIG. 2, bearing flange 31 is in face-to-face contact with bearing means 21 in a relationship which will be well understood by those with skill in the art as a thrust bearing relationship. Bearing means 21 may be stationary or it may be rotatable, such as might be found when using a ball or roller type thrust bearing. In the preferred embodiment, where a Teflon ® PTFE ring is used, bearing means 21 would preferably be stationary, although occasional rotation thereof in relation to meat pump 13 will cause no difficulty, problem or harm.

Also, as shown in FIG. 2, adjustable sizing head 35 and stationary sizing head 47 are in face-to-face relationship. In the assembly of the sizing means of the present invention, as mounted on stuffing horn 11, bearing means 21, adjustment means 23 and stationary sizing fixture 43 are all axially aligned with the axis of stuffing horn 11 and are all coaxial therewith.

Figures 3, 4, 5, 6:
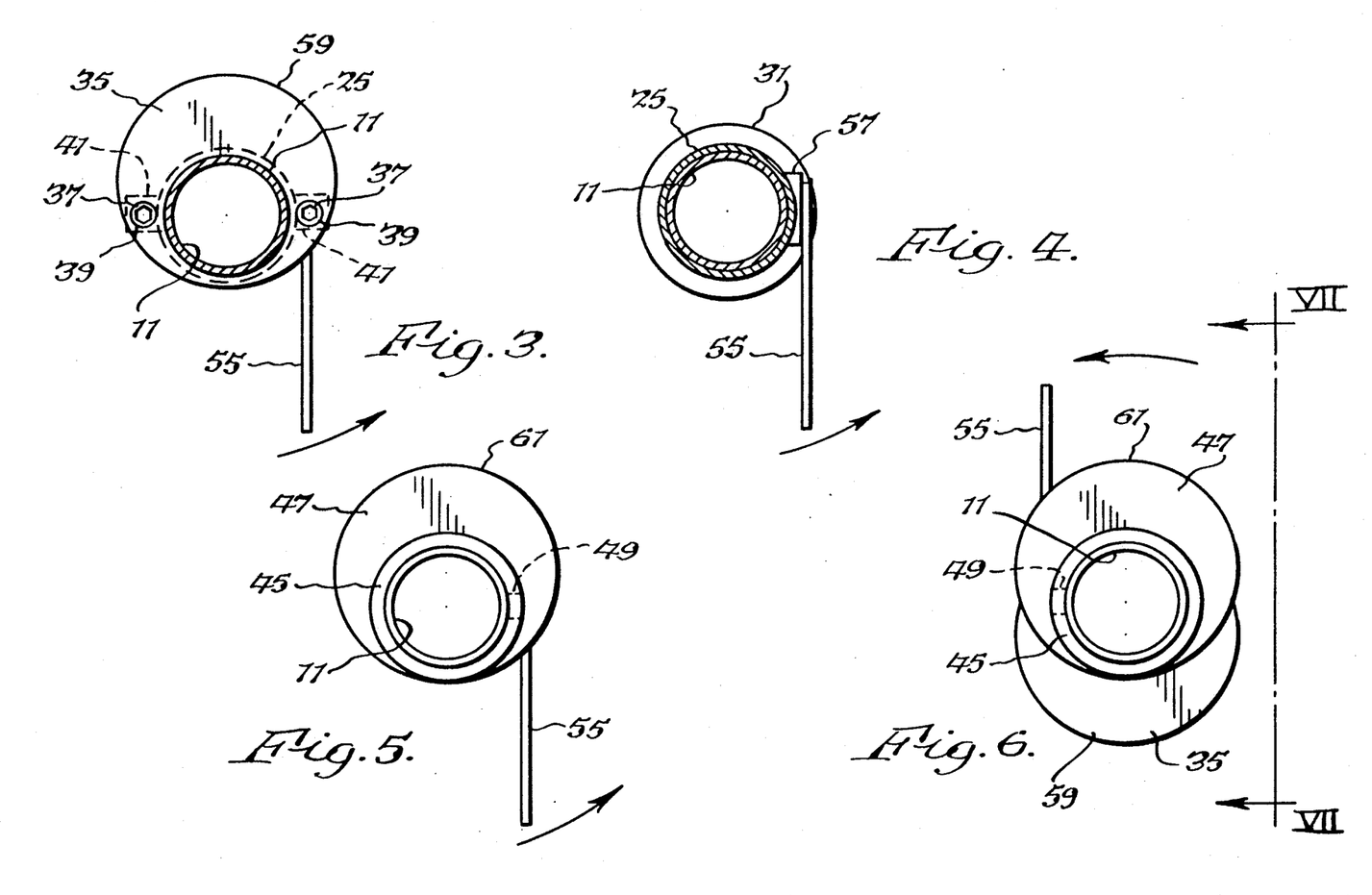
FIG. 3 is a front elevational view, in cut-away, as shown from position III—III of FIG. 2.
FIG. 4 is a front elevational view, in cut-away, as viewed from position IV—IV of FIG. 2.
FIG. 5 is a front elevational view of the sizing means of the present invention in its fully retracted position as shown from view V—V of FIG. 2.
FIG. 6 is a front elevational view of the sizing means of the present invention as viewed from the position of VI—VI of FIG. 7.

FIG. 3 shows a front view of the sizing means of the present invention in cut-away as viewed from the position of III—III in FIG. 2. As can be readily seen from viewing FIG. 3, the radial center point of adjustable sizing head 35 is offset from the radial center point of adjustment tube 25 and stuffing horn 11. However, the axis of rotation of adjustable sizing head 35 is still maintained as the axis of rotation of adjustment tube 25, and both are coincident to and coaxial with the longitudinal axis of stuffing horn 11.

As will be recognized by viewing FIG. 3 because the axis of rotation of adjustable sizing head is eccentric, as handle 55 is rotated in the direction of the arrow extending to the right, away from handle 55, contact surface 59 of adjustable sizing head 5 will be rotated in an arc which describes a circumferential path having a radius which extends from the axis of rotation of adjustment tube 25 to contact surface 59. As will also be noted from viewing FIG. 3, the distance from the axis of rotation of adjustment tube 25 to a point on adjustable sizing head 35 which is directly opposite from contact surface 59, is substantially less than the radius which extends from that axis of rotation of adjustment tube 25 to contact surface 59 as a result of its eccentric axis. Thus, the circumferential path described from that opposite point will be substantially less in diameter than for the diameter associated with the circumferential path described by contact surface 59.

FIG. 4 is a cut-away view from the front as viewed from position IV—IV of FIG. 2. FIG. 4 shows handle 55 attached to handle mount 57 which, in turn, is attached to the wall of adjustment tube 25 as described previously. Bearing flange 31 is also shown in position against bearing means 21 which is not shown in FIG. 4 as it is behind bearing flange 31 in the view of FIG. 4. The positioning of adjustment tube 25, telescoped (sheathed) over stuffing horn 11, is clearly shown in FIG. 4. In the preferred operation of the sizing means of the present invention, stuffing horn 11 remains stationary, in position, while the movement of handle 55 in the direction shown by the arrow, extending from handle 55 in FIG. 4, causes rotation of adjustment tube 25 about stuffing horn 11. This rotation causes bearing flange 31 to rotate in face-to-face relationship against bearing means 21. As mentioned previously, handle mount 57 reinforces the attachment of handle 55 to the wall of adjustment tube 25.

Referring to FIG. 5, there is shown a front elevational view of the sizing means of the present invention as viewed from position V-V of FIG. 2. As can be seen from FIG. 5, set screw 49 extends radially through the wall of fixed collar 45, and thus set screw 49 can be tightened against stuffing horn 11 to lock stationary sizing fixture 43 in position in relation to stuffing horn 11. Also as shown in FIG. 5, stationary sizing head 14 is directly aligned with the position of adjustable sizing head 35 as shown in FIG. 3, thus, adjustable sizing head 35 cannot be seen in FIG. 5 but is directly behind stationary sizing head 47 in the view shown in FIG. 5.

In the preferred embodiment of the present invention, stationary sizing head 47 is identical in shape and size to adjustable sizing head 35, both of which are in the form of circular discs with eccentric axes of rotation. As mentioned previously, adjustable sizing head 35 rotates about the axis of rotation of adjustment tube 25, that axis of rotation of adjustment tube 25 being coincident and coaxial with the longitudinal axis of stuffing horn 11. On the other hand, stationary sizing head 47, being mounted to fixed collar 45, does not rotate, but rather remains in the position shown in FIG. 5. Rotation of handle 55, from the positions shown in FIGS. 3, 4 and 5 to the position shown in FIG. 6, a 180° arc of rotation, causes the rotation of adjustment tube 25 and consequently the rotation of adjustable sizing head 35 to the position as shown in FIG. 6.

The sizing means of the preferred embodiment of the present invention as shown in FIG. 5 is in the fully retracted position such that unshirred casing material, with an internal circumference at least as large as the circumference of stationary sizing head 47 (which is the same circumference as that of adjustable sizing head 35), may be readily fitted over that circumference with some degree of clearance therebetween.

Referring to FIG. 6, there is shown the fully extended position of the sizing means of the present invention. The peripheral distance extends, beginning from contact surface 59, around that circumferential surface portion of stationary sizing head 47 which extends beyond the circumferential surface of adjustable sizing head 35, and then likewise continues to extend around that portion of the extension of the circumferential surface of adjustable sizing head 35 which extends beyond that of stationary sizing head 47. Thus, a peripheral surface is inscribed which is substantially larger than that of the circumference of either stationary sizing head 47 or adjustable sizing head 35 taken individually. As shown in FIG. 6, contact surfaces 59 and 61 are now brought into engagement with the inside surface of a portion of tubular casing 63 (shown in FIG. 7) which has been deshirred from the shirred casing material which had been formed over the exterior surface of stationary sizing head 47 and adjustable sizing head 35 when in their retracted position as shown in FIG. 5. The formation of the shirred casing material will be further explained hereinafter in reference to FIG. 11. Thus, the peripheral distance inscribed, in relation to the fully extended positioning of the sizing means of the present invention as shown in FIG. 6, is sufficiently great enough to preferably be larger than the circumferential dimension of the inside surface of the fully extended, deshirred casing tube.

In the extended position shown in FIG. 6, contact surfaces 59 and 61 serve to expand, and if desired, to stretch the casing material as it traverses over those surfaces, in direct relation to the degree of extension of those contact surfaces 59 and 61. It will be understood by those with skill in the art that rotation of handle 55 from the position shown in FIG. 5 through a lesser arc than 180° (as shown in FIG. 6) will result in a lesser extension of adjustable sizing head 35, from the retracted position shown in FIG. 5, permitting the peripheral distance which inscribes contact surfaces 59 and 61 to be adjusted to any degree, from that of fully retracted as shown in FIG. 5 to that of fully extended as shown in FIG. 6. Thus, the degree of frictional contact between contact surfaces 59 and 61 and the inner surface of the tubular casing are infinitely adjustable up to a point of full expansion of the tubular casing or beyond to a stretched position, over-expanding the tubular casing by stretching it beyond its original interior circumference if desired.

Figure 7:
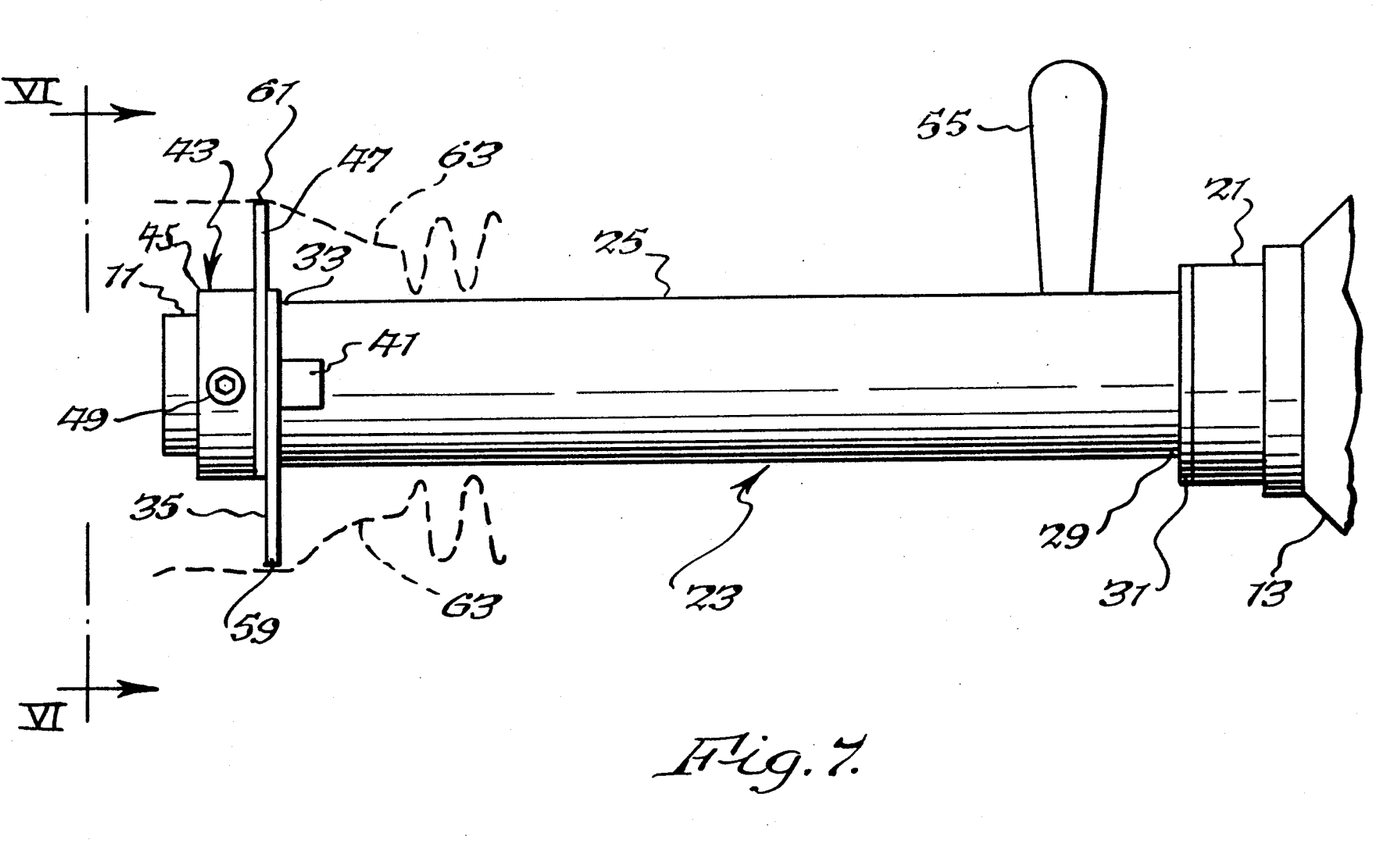
FIG. 7 is a side elevational view of the sizing means of the present invention in its fully extended position as viewed from position VII—VII of FIG. 6.

Referring to FIG. 7, there is shown a side elevational view of the fully extended positioning of the sizing means of the present invention as viewed from position VII-VII of FIG. 6. Also shown in dotted line form is a representation of the extension of a tubular casing 63 being stretched over contact surfaces 59 and 61. Note, in the view of FIG. 7, that stationary sizing head 47 remains in the same position as is shown in FIGS. 2, 5 and 6, while adjustable sizing head 35 now extends downwardly opposite from the position shown in FIGS. 2 and 3 to the position shown in FIG. 6. Also note in FIG. 7 that handle 55 is shown as extending upwardly, opposite to the position that is shown in FIGS. 2-5; this is because handle 55 has been rotated 180° as shown in comparing FIGS. 5 and 6. As will be understood by those with skill in the art, all of adjustment means 23 has been rotated 180° from the position shown in FIG. 2 to that shown in FIG. 7. It is to be understood that adjustment means 23, in the preferred embodiment, comprises adjustment tube 25, bearing flange 31, adjustable sizing head 35, recessed cap screws 37, bolt blocks 41, handle 55 and handle mount 57.

Figures 8, 9, 10:
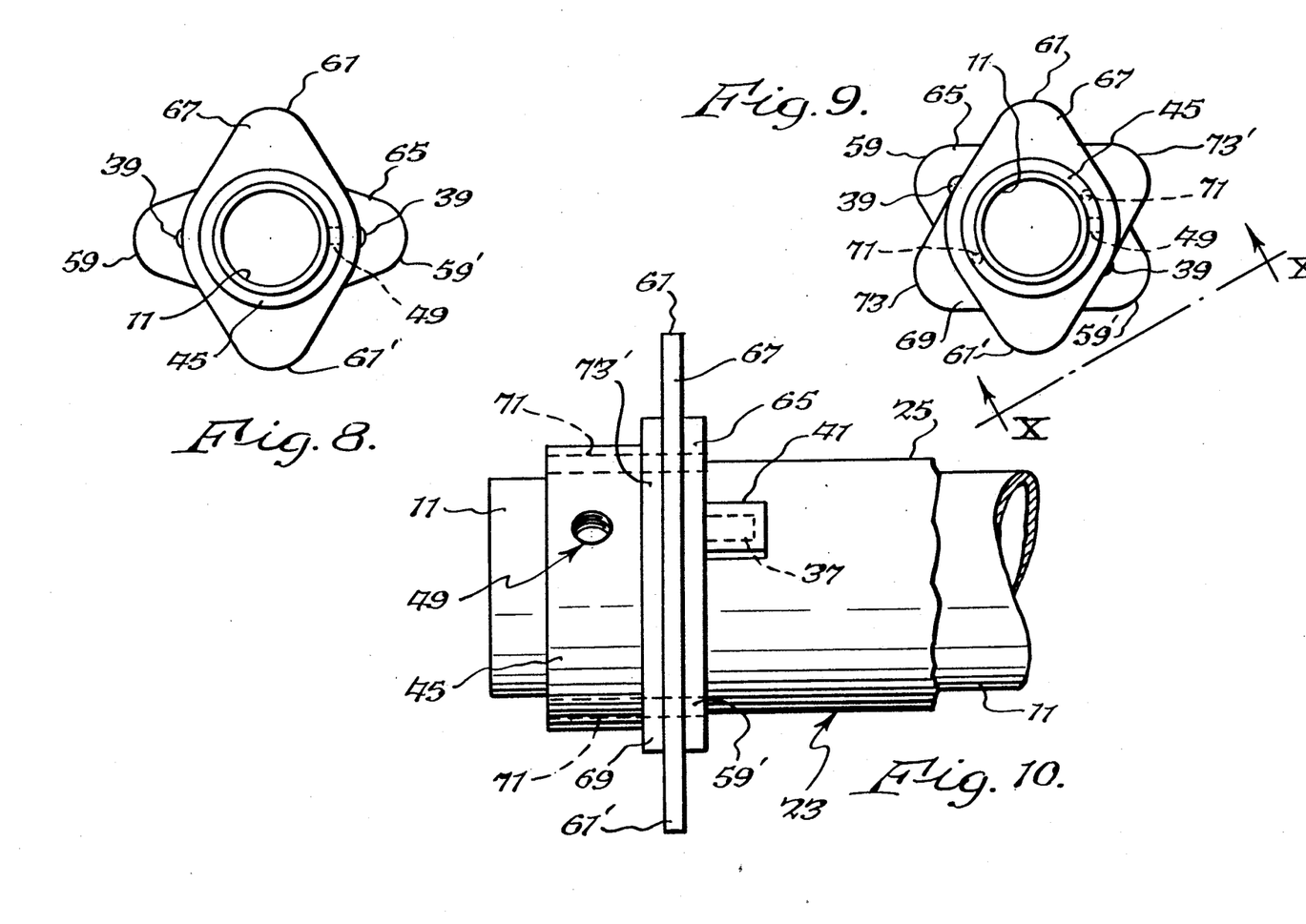
FIG. 8 is a front elevational view of a first alternate embodiment of the sizing means of the present invention as shown in its fully extended position.
FIG. 9 is a front elevational view of a second alternate embodiment of the sizing means of the present invention shown in its fully extended position.
FIG. 10 is a side elevational view of a section of the sizing means of the second alternate embodiment of the present invention in its fully extended position as shown by a view from position X—X of FIG. 9.

Referring to FIG. 8, there is shown an alternate embodiment of the sizing means of the present invention. In the embodiment shown in FIG. 8, adjustable sizing head 65 is in the form of a modified diamond with the tips of the diamonds being rounded off. Likewise, stationary sizing head 67 is in the same form of a modified diamond with the tips of the diamond being rounded off. All other elements are identical to those described before in relation to FIGS. 1-7. In FIG. 8, as will be well understood by those with skill in the art, adjustment means 23 need only be rotated 90° to achieve full extension of contact surfaces 59 and 61. In the embodiment shown in FIG. 8, there are four contact surfaces: 59, 59', 61 and 61', yet the area engaged by each of those surfaces is substantially reduced due to a smaller radius for the rounded off points of the diamonds in comparison to the circular surfaces of stationary sizing head 47 and adjustable sizing head 35. The embodiment shown in FIG. 8 is particularly adapted to use with casings made of water soaked reconstituted cellulose such as might be employed, for example, in the production of, frankfurters.

Yet another alternate embodiment of the present invention is shown in FIG. 9. This second alternate embodiment is a variation on the first alternate embodiment shown in FIG. 8. In FIG. 9 there is shown adjustable sizing head 65 and stationary sizing head 67. In addition, variable sizing head 69 is added. Variable sizing head 69 is identical in size and form to that of the rounded off diamond form of adjustable sizing head and stationary sizing head 67 as shown in FIGS. 8, 9 and 10. Variable sizing head 69, in the position shown in both FIGS. 9 and 10, is locked to stationary sizing head 67 using hex-head lock screws 71 as will be well understood by those with skill in the art. The embodiment shown in FIG. 9 provides a total of six contact surfaces 59, 59', 61, 61', 73 and 73' which engage the interior surface of the tubular casing wall. Loosening off hex-head lock screws 71 permits the rotation of variable sizing head 69, independently of either stationary sizing head 67 or adjustable sizing head 65, such that variable sizing head 69 can be aligned with stationary sizing head 67, for example, to enable a shirred casing stick to be sheathed thereover. Rotation of adjustment means 23, in turn, causes adjustable sizing head 65 to be aligned with stationary sizing head 67, thus, resulting in the full retraction of the sizing means of the second alternate embodiment shown in FIGS. 9 and 10.

Once the casing material has been fitted over the second alternate embodiment of the sizing means shown in FIGS. 9 and 10, that casing material being shirred in the process as will be further explained hereinafter in reference to FIG. 11, variable sizing head 69 is rotated 60° and hex-head lock screws 71 are set in place, thus locking variable sizing head 69 to stationary sizing head 67 as mentioned above. A portion of the shirred casing material is unshirred and the tubular section thereof is extended across the second alternate embodiment of the sizing means shown in FIGS. 9 and 10. Then, adjustment means 23 is rotated to any degree up to 60° to provide the degree of frictional contact that is desired, even to the extent of stretching the circumference of the tubular casing section as it traverses the extended position of adjustable sizing head 65, stationary sizing head 67 and variable sizing head 69. The contact surfaces 59, 59', 61, 61', 73 and 73' of the embodiment shown in FIGS. 9 and 10 are those portions of adjustable sizing head 65, stationary sizing head 67 and variable sizing head 69, respectively, which engage the interior surface of the tubular casing.

As will be understood by those with skill in the art, it is possible to likewise make variable sizing head 69 infinitely adjustable in the same manner that adjustable sizing head 65 is infinitely adjustable. This could be done by interposing a second adjustment tube between adjustment tube 25 and stuffing horn 11 such that variable sizing head 69 could be adjusted in the same manner that adjustable head 65 is adjusted by rotation of adjustment tube 25.

Figure 11:
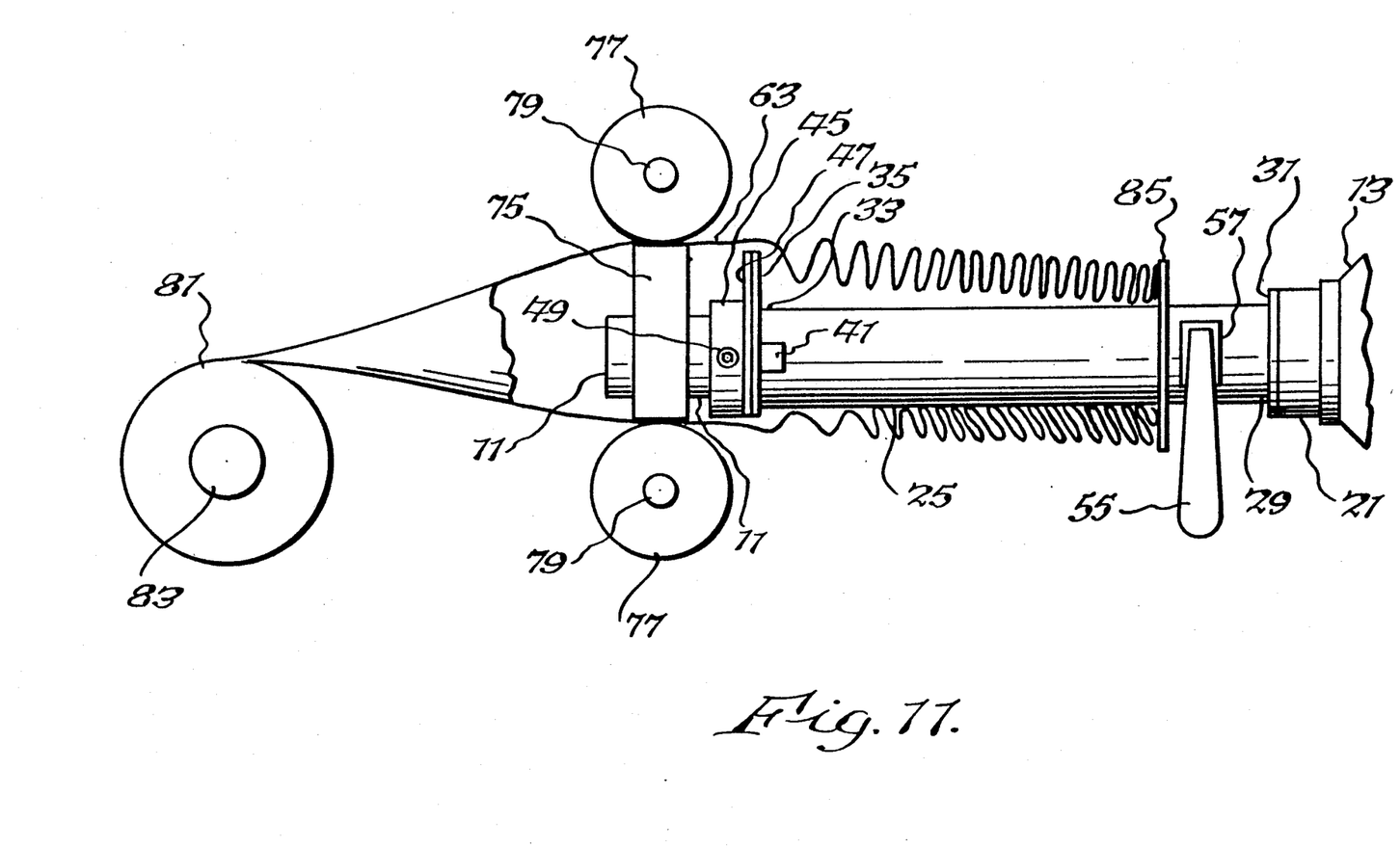
FIG. 11 is a side elevational view of the sizing means of the present invention as shown in FIG. 2, but with the addition of a schematic representation of means for shirring the flattened casing material as it is telescoped onto the stuffing horn over the sizing means.

Means for shirring the tubular casing 63 onto the stuffing horn are shown in FIG. 11 comprising a casing expansion collar 75 which is fitted over the output end 17 of stuffing horn 11 and preferably positioned in a spaced apart relationship to fixed collar 45, although casing expansion collar 75 could abut fixed collar 45 in a face-to-face relationship as will be understood by those with skill in the art. Casing expansion collar 75 is preferably in the form at a truncated cylindrical section having a bore therethrough which extends parallel to the axis of rotation at that cylindrical section but which is offset therefrom to the same extent that the radial center point of adjustable sizing head 35 is offset from the radial center point of adjustment tube 25 as was explained above in reference to FIG. 3. Casing expansion collar 75 is somewhat larger in diameter than either adjustable sizing head 35 or stationary sizing head 47. Thus, tubular casing 63 which is sheathed over casing expansion collar 75 has sufficient clearance to be easily sheathed over both adjustable sizing head 35 and stationary sizing head 47 when in the fully retracted position as shown in FIG. 5.

The function of casing expansion collar 75 is to open up tubular casing material 63 from a flattened posture to the form of a hollow cylindrical section as tubular casing 63 is sheathed (telescoped) over casing expansion collar 75. Also, casing expansion collar 75 provides backup support for shirring rollers 77 which drive the outer surface of tubular casing 63 over casing expansion collar 75 and onto the sizing means of the present invention as shown in FIG. 11.

Shirring rollers 77 are formed preferably from a resilient material, for example, a urethane elastomer or a synthetic rubber such as neoprene. The axes of rotation of shirring rollers 77 are perpendicular to the axis of rotation of casing expansion collar 75. Shirring rollers 77 are sized and positioned such that they will frictionally be in contact with the outside surface of tubular casing 63 as it passes over casing expansion collar 75; thus, rotation of shirring rollers 77 serves to drive tubular casing 63 over casing expansion collar 75, telescoping tubular casing 63 over both the sizing means of the present invention and stuffing horn 11. Shirring rollers 77 are mounted on power driver shafts 79 which cause shirring rollers 77 to rotate in frictional contact with the outer surface of tubular casing 63. The inner surface of tubular casing 63 slides across the smooth outer surface of casing expansion collar 75.

Tubular casing 63, initially, is in a flattened form being packaged on a reel 81 which is suspended on mandrel 83 which is free to rotate. The rotation of shirring roller 77 by power driver shafts 79 causes tubular casing 63 to pay out from reel 81. Initially, the end of tubular casing 63 is fed, usually manually, over casing expansion collar 75 where it is engaged by shirring rollers 77 which feed tubular casing 63 over the sizing means of the present invention and stuffing horn 11. The end of tubular casing 63, as so fed, comes into contact with casing stop 85 which, for example, may be a ring mounted to adjustment tube 25 at a location which is adjacent to handle 55 and handle mount 57 as shown in FIG. 11. As will be well understood by those with skill in the art, casing stop 85 may readily take a variety of different forms. Likewise, casing stop 85 could be integral with handle 55 or handle mount 57 or both.

As tubular casing 63 comes into casing stop 85, it begins to, and continues, to bunch up, taking the form of accordion pleating. Thus the tubular casing 63 is shirred as shown in FIG. 11, allowing, for example, as much as 100 feet or more of the tubular casing 63 to be shirred onto the relatively short length of the sizing means of the present invention and the stuffing horn 11.

While FIG. 11 shows a reel 81 of flattened tubular casing suspended on a mandrel, it will be understood that such casing may also be folded in a carton container (not shown) for payout to the shirring mechanism, previously described.

Regardless of whether flattened casing 63 is supplied from a continuous reel or in folded form from a carton, the apparatus of FIG. 11 also contemplates casing feed, lock and adjustment means of known design (not shown) positioned between reel 81 and shirring rollers 77 to assist in withdrawing a predetermined length of flattened casing from the casing supply source for delivery to the stuffing horn for shirring in the manner previously described.

The system for delivery of casing to the stuffing horn also advantageously includes a reciprocating casing carrier for transporting the terminal end section of a new length of casing from the supply source to stuffing horn 11 for shirring. Suitable representative feed, lock and casing carrier apparatus for withdrawing and transporting lengths of casing to the stuffing horn are disclosed in detail by U.S. Pat. No. 3,919,739, and particularly U.S. Pat. No. 4,534,084, the disclosures of which are incorporated by reference herein.

Although the preferred and alternate embodiments of the present invention have been described in considerable detail, it will be apparent to those skilled in the art that those preferred and alternate embodiments of the present invention are capable of numerous modifications, variations and combinations without departing from the concepts, spirit and scope of the present invention as defined by the appended claims which are hereby specifically included, by this reference, in the foregoing specification.

What is claimed is:

1. A food stuffing apparatus for tubular casings, which comprises:
   (a) food casing filling horn means with a food inlet end, a food outlet end and a cylindrical shaft intermediate to said inlet and outlet ends, and pump means for extruding a foodstuff through said food casing filling horn means,
   (b) a stationary food casing sizing means and an adjustable food casing sizing means telescoped over said cylindrical shaft of said food casing filling horn means for expansion of unfilled tubular casing loaded thereon, both said stationary food casing sizing means and said adjustable food casing sizing means having means for engaging and peripherally expanding said tubular casing with movement of said adjustable food casing sizing means, and
   (c) means for shirring said tubular casing onto said food casing filling horn means and over said food casing sizing means without disassembly or removal as said tubular casing is loaded onto said food casing filling horn means.

2. The food stuffing apparatus of claim 1 wherein said adjustable food casing sizing means is adapted for rotational movement about its longitudinal axis.

3. The food stuffing apparatus of claim 2 wherein said means for engaging and peripherally expanding said food casing comprises a plurality of casing sizing heads wherein at least one of said sizing heads is fixed to each of said adjustable food casing sizing means and stationary food casing sizing means.

4. The food stuffing apparatus of claim 3 wherein said adjustable food casing sizing means comprises a cylindrical body with a stuffing horn inlet end, a stuffing horn outlet end and at least one casing sizing head mounted to said cylindrical body in a plane which is transverse to the longitudinal axis of said cylindrical body.

5. The food stuffing apparatus of claim 4 wherein said stationary food casing sizing means comprises a fixture with at least one casing sizing head in a fixed position in a plane which is transverse to the longitudinal axis of said food casing filling horn and located adjacent to said stuffing horn outlet end of said cylindrical body of said adjustable food casing sizing means.

6. The food stuffing apparatus of claim 5 wherein said casing sizing head on said adjustable food casing sizing means is mounted in a fixed position in proximity to said stuffing horn outlet end of said cylindrical body and adjacent to said stationary food casing sizing head.

7. The food stuffing apparatus of claim 3 wherein said casing sizing heads are adjustable such that in their retracted position food casing may be shirred onto the apparatus for filling without disassembly or removal.

8. The food stuffing apparatus of claim 6 wherein the casing sizing heads are circular in shape and eccentrically mounted on said adjustable and stationary food casing sizing means for expansion of said tubular casing upon rotation of said adjustable food casing sizing means relative said to stationary food casing sizing means.

9. The foot stuffing apparatus of claim 6 wherein the casing sizing heads are oblong and centrally mounted on said adjustable and stationary food casing sizing means.

10. The food stuffing apparatus of claim 1 wherein said means for shirring said tubular food casing onto said food casing filling horn means includes means for expanding a source of flattened casing and wheel means for engaging and folding said casing into a pleated strand.

11. The food stuffing apparatus of claim 10 including casing carrier means for transporting a terminal end section of a new length of unshirred casing to said stuffing horn for shirring.

12. A method of stuffing a tubular food casing, which comprises the steps of:
(a) providing a stuffing apparatus for tubular food casing comprising a filling horn, pump means for extruding a foodstuff through said filling horn, a stationary casing sizer head and an adjustable casing sizer head, said casing sizer heads telescoped over said filling horn and positioned transverse to the longitudinal axis of said filling horn;
(b) rotating said adjustable casing sizer head to substantially align it with said stationary sizer head;
(c) shirring a tubular food casing onto said filling horn as said casing is loaded onto said filling horn, and over said casing sizer heads without disassembly or removal, and
(d) rotating said adjustable casing sizer head sufficiently for both said stationary casing sizer head and adjustable casing sizer head to engage and peripherally expand said casing on said filling horn as a foodstuff is extruded into said casing to withdraw empty casing from said filling horn.

* * * * *